United States Patent
Hakola et al.

(10) Patent No.: US 12,167,342 B2
(45) Date of Patent: Dec. 10, 2024

(54) DETERMINATION AND USE OF UPLINK DUTY CYCLE IN TDD TO REDUCE RADIATION EXPOSURE FROM UES IN UL

(71) Applicant: Nokia Technologies Oy, Espoo (FI)

(72) Inventors: Sami-Jukka Hakola, Kempele (FI); Jorma Kaikkonen, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 390 days.

(21) Appl. No.: 17/632,324

(22) PCT Filed: Aug. 13, 2020

(86) PCT No.: PCT/IB2020/057647
§ 371 (c)(1),
(2) Date: Feb. 2, 2022

(87) PCT Pub. No.: WO2021/033092
PCT Pub. Date: Feb. 25, 2021

(65) Prior Publication Data
US 2022/0295412 A1    Sep. 15, 2022

Related U.S. Application Data

(60) Provisional application No. 62/887,981, filed on Aug. 16, 2019.

(51) Int. Cl.
*H04W 52/14* (2009.01)
*H04L 5/14* (2006.01)
(Continued)

(52) U.S. Cl.
CPC ......... *H04W 52/146* (2013.01); *H04L 5/1469* (2013.01); *H04W 52/367* (2013.01); *H04W 52/42* (2013.01)

(58) Field of Classification Search
CPC . H04W 52/367; H04W 52/42; H04W 52/146; H04W 72/21; H04W 52/34;
(Continued)

(56) References Cited

U.S. PATENT DOCUMENTS

2018/0167897 A1    6/2018 Sampath et al.
2020/0314764 A1*  10/2020 Noh ................... H04W 52/146
(Continued)

OTHER PUBLICATIONS

"3rd Generation Partnership Project; Technical Specification Group Radio Access Network; NR; User Equipment (UE) radio transmission and reception; Part 2: Range 2 Standalone (Release 15)", 3GPP TS 38.101-2, V15.5.0, Mar. 2019, pp. 1-142.
(Continued)

*Primary Examiner* — David Q Nguyen
(74) *Attorney, Agent, or Firm* — Robert P. Michal, Esq.; Carter, DeLuca & Farrell LLP

(57) ABSTRACT

A UE, communicating with a network node by using TDD, determines a downlink/uplink configuration between the UE and the network node, and a maximum uplink duty cycle for candidate uplink transmit beam(s). The UE compares the maximum uplink duty cycle with an uplink duty cycle of the determined downlink/uplink configuration, and provides to the network node information associated with the comparison. The network node receives the information associated with the comparison and determines whether to modify the downlink/uplink configuration between the user equipment and the network node based on the information associated with the comparison. The network node indicates, in response to a determination the downlink/uplink configuration should be modified, a modified downlink/uplink configuration to the user equipment.

1 Claim, 4 Drawing Sheets

(51) Int. Cl.
*H04W 52/36* (2009.01)
*H04W 52/42* (2009.01)

(58) Field of Classification Search
CPC . H04W 52/365; H04W 52/36; H04W 52/243; H04W 72/0473; H04W 72/20; H04L 1/0003; H04B 17/336; H04B 1/3838
USPC ......... 455/407, 408; 370/328, 329, 330, 331
See application file for complete search history.

(56) References Cited

U.S. PATENT DOCUMENTS

| | | | | |
|---|---|---|---|---|
| 2020/0314765 | A1* | 10/2020 | Jung | H04W 52/367 |
| 2020/0383067 | A1* | 12/2020 | Liu | H04L 1/0003 |
| 2022/0116891 | A1* | 4/2022 | Yao | H04W 52/42 |

OTHER PUBLICATIONS

"Guidelines for limiting exposure to time-varying electric, magnetic, and electromagnetic fields (up to 300 Ghz)", ICNIRP Guidelines, Health Physics, vol. 74, No. 4, Apr. 1998, pp. 494-522.
"§ 1.1310 Radiofrequency radiation exposure limits", Music Technology Group, Retrieved on Jan. 28, 2022, Webpage available at : https://www.ecfr.gov/current/title-47/chapter-I/subchapter-A/part-1/subpart-I/section-1.1310.
Thors et al., "Exposure to RF EMF From Array Antennas in 5G Mobile Communication Equipment", IEEE Access, vol. 4, Aug. 17, 2016, pp. 7469-7478.
Wu et al., "Safe for generations to come: Considerations of safety for millimeter waves in wireless communications", IEEE Microwave Magazine, vol. 16, No. 2, Mar. 2015, pp. 65-84.
"3rd Generation Partnership Project; Technical Specification Group Radio Access Network; NR; Physical layer procedures for control (Release 15)", 3GPP TS 38.213, V15.5.0, Mar. 2019, pp. 1-104.
International Search Report and Written Opinion received for corresponding Patent Cooperation Treaty Application No. PCT/IB2020/057647, dated Nov. 13, 2020, 18 pages.
"On RAN4 UE feature list for NR: Introduction of Maximum UL duty cycle UE capability", 3GPP TSG RAN WG1 Meeting #96bis, R1-1905228, Agenda: 5, Nokia, Apr. 8-12, 2019, 3 pages.
"Handling of maximum UL duty cycle", 3GPP TSG-RAN WG2 Meeting #105bis, R2-1904175, Agenda: 10.4.4, Nokia, Apr. 8-12, 2019, 4 pages.
"On FR2 RF Exposure mitigation methods", 3GPP TSG RAN WG1 Meeting #96bis, R1-1905229, Agenda: 5, Nokia, Apr. 8-12, 2019, 3 pages.
"On deriving FDD+TDD TDM pattern based on max UL duty cycle capability", 3GPP TSG-RAN WG4 Meeting #91, R4-1906859, Agenda: 10.3.1, Huawei, May 13-17, 2019, 4 pages.
"TP for TR 37.815: TDM pattern solution for SAR limits", 3GPP TSG-RAN WG4 Meeting #91, R4-1906860, Agenda: 10.3.1, Huawei, May 13-17, 2019, 3 pages.
"3rd Generation Partnership Project; Technical Specification Group Radio Access Network; NR; User Equipment (UE) radio access capabilities (Release 15)", 3GPP TS 38.306, V15.5.0, Mar. 2019, pp. 1-49.
"3rd Generation Partnership Project; Technical Specification Group Radio Access Network; NR; Physical layer procedures for data (Release 15)", 3GPP TS 38.214, V15.5.0, Mar. 2019, pp. 1-103.
"3rd Generation Partnership Project; Technical Specification Group Radio Access Network; NR; Medium Access Control (MAC) protocol specification (Release 15)", 3GPP TS 38.321, V15.5.0, Mar. 2019, pp. 1-78.
"3rd Generation Partnership Project; Technical Specification Group Radio Access Network; NR; Radio Resource Control (RRC) protocol specification (Release 15)", 3GPP TS 38.331, V15.5.1, Apr. 2019, pp. 1-491.

\* cited by examiner

DETERMINATION AND USE OF UPLINK DUTY CYCLE IN TDD TO REDUCE RADIATION EXPOSURE FROM UES IN UL

RELATED APPLICATION

This application claims priority to PCT Application No. PCT/IB2020/057647, filed on Aug. 13, 2020 which claims priority to U.S. Application No. 62/887,981, filed on Aug. 16, 2019, each of which is incorporated herein by reference in its entirety.

TECHNICAL FIELD

This invention relates generally to wireless communications and, more specifically, relates to uplink communications in time domain duplex (TDD) communications.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, at the beginning of the detailed description section.

When a user uses a user equipment (UE, a wireless, typically mobile device, also referred to as a terminal) to communicate with a wireless network, there are certain parameters the UE has to meet. One is to transmit under a maximum power to reduce electromagnetic energy the user might absorb. That is, within the same frequency range, the limits for maximum permissible exposure (MPE), including electric field strength, magnetic field strength, and power density, may be used. An organization with responsibility for terminal specifications is RAN4, a Radio Access Network (RAN) Working Group (WG). To ensure compliance with applicable electromagnetic energy absorption requirements and addressing unwanted emissions, RAN4 has agreed so far to using two techniques for New Radio (NR): P-MPR and maxUplinkDutyCycle. The P-MPR is an allowed maximum output power reduction, and the maxUplinkDutyCycle is the UE-reported maximum duty cycle to facilitate compliance such that the P-MPR is below some maximum.

There are, however, issues with these techniques.

BRIEF SUMMARY

This section is intended to include examples and is not intended to be limiting.

In an exemplary embodiment, a method is disclosed that includes determining, by a user equipment in a wireless communication system, the user equipment communicating with a network node in the wireless communication system using time-division duplexing, a downlink/uplink configuration between the user equipment and the network node. The method includes determining by the user equipment a maximum uplink duty cycle for one or more candidate uplink transmit beams, and comparing by the user equipment the maximum uplink duty cycle with an uplink duty cycle of the determined downlink/uplink configuration. The method also includes providing, by the user equipment and towards the network node, information associated with the comparison of the maximum uplink duty cycle and the uplink duty cycle of the determined downlink/uplink configuration.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to perform operations comprising: determining, by a user equipment in a wireless communication system, the user equipment communicating with a network node in the wireless communication system using time-division duplexing, a downlink/uplink configuration between the user equipment and the network node; determining by the user equipment a maximum uplink duty cycle for one or more candidate uplink transmit beams; comparing by the user equipment the maximum uplink duty cycle with an uplink duty cycle of the determined downlink/uplink configuration; and providing, by the user equipment and towards the network node, information associated with the comparison of the maximum uplink duty cycle and the uplink duty cycle of the determined downlink/uplink configuration.

An exemplary computer program product includes a computer-readable storage medium bearing computer program code embodied therein for use with a computer. The computer program code includes: code for determining, by a user equipment in a wireless communication system, the user equipment communicating with a network node in the wireless communication system using time-division duplexing, a downlink/uplink configuration between the user equipment and the network node; code for determining by the user equipment a maximum uplink duty cycle for one or more candidate uplink transmit beams; code for comparing by the user equipment the maximum uplink duty cycle with an uplink duty cycle of the determined downlink/uplink configuration; and code for providing, by the user equipment and towards the network node, information associated with the comparison of the maximum uplink duty cycle and the uplink duty cycle of the determined downlink/uplink configuration.

In another exemplary embodiment, an apparatus comprises means for performing: determining, by a user equipment in a wireless communication system, the user equipment communicating with a network node in the wireless communication system using time-division duplexing, a downlink/uplink configuration between the user equipment and the network node; determining by the user equipment a maximum uplink duty cycle for one or more candidate uplink transmit beams; comparing by the user equipment the maximum uplink duty cycle with an uplink duty cycle of the determined downlink/uplink configuration; and providing, by the user equipment and towards the network node, information associated with the comparison of the maximum uplink duty cycle and the uplink duty cycle of the determined downlink/uplink configuration.

In an exemplary embodiment, a method is disclosed that includes receiving, at a network node in a wireless communication system and from a user equipment in the system, information associated with a comparison between a maximum uplink duty cycle for the user equipment and an uplink duty cycle of a downlink/uplink configuration between the user equipment and the network node. The method includes determining by the network node whether to modify a downlink/uplink configuration between the user equipment and the network node based on the information associated with the comparison. The method also includes indicating, by the network node and in response to a determination the downlink/uplink configuration should be modified, a modified downlink/uplink configuration to the user equipment.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to perform operations comprising: receiving, at a network node in a wireless communication system and from a user equipment in the system, information associated with a comparison between a maximum uplink duty cycle for the user equipment and an uplink duty cycle of a downlink/uplink configuration between the user equipment and the network node; determining by the network node whether to modify a downlink/uplink configuration between the user equipment and the network node based on the information associated with the comparison; and indicating, by the network node and in response to a determination the downlink/uplink configuration should be modified, a modified downlink/uplink configuration to the user equipment.

An exemplary computer program product includes a computer-readable storage medium bearing computer program code embodied therein for use with a computer. The computer program code includes: code for receiving, at a network node in a wireless communication system and from a user equipment in the system, information associated with a comparison between a maximum uplink duty cycle for the user equipment and an uplink duty cycle of a downlink/uplink configuration between the user equipment and the network node; code for determining by the network node whether to modify a downlink/uplink configuration between the user equipment and the network node based on the information associated with the comparison; and code for indicating, by the network node and in response to a determination the downlink/uplink configuration should be modified, a modified downlink/uplink configuration to the user equipment.

In another exemplary embodiment, an apparatus comprises means for performing: receiving, at a network node in a wireless communication system and from a user equipment in the system, information associated with a comparison between a maximum uplink duty cycle for the user equipment and an uplink duty cycle of a downlink/uplink configuration between the user equipment and the network node; determining by the network node whether to modify a downlink/uplink configuration between the user equipment and the network node based on the information associated with the comparison; and indicating, by the network node and in response to a determination the downlink/uplink configuration should be modified, a modified downlink/uplink configuration to the user equipment.

DETAILED DESCRIPTION OF THE DRAWINGS

Figure 1:
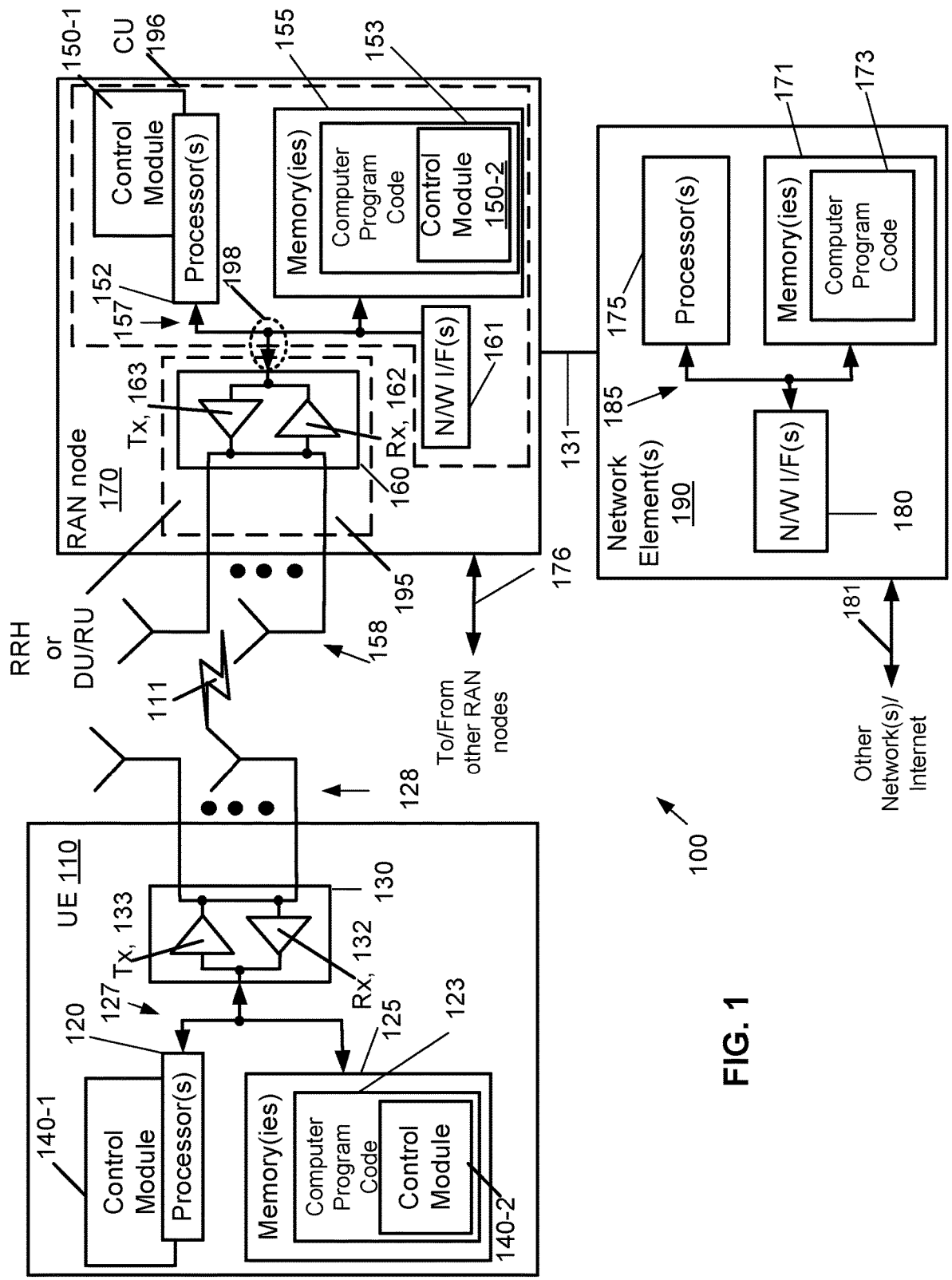
FIG. 1 is a block diagram of one possible and non-limiting exemplary system in which the exemplary embodiments may be practiced.

The following abbreviations that may be found in the specification and/or the drawing figures are defined as follows:

3GPP third generation partnership project
5G fifth generation
5GC 5G core network
AMF access and mobility management function
BWP Bandwidth Part
CU central unit
DCI Downlink Control Information
DL Downlink (from the network toward the UE)
DU distributed unit
EIRP Effective (or Equivalent) Isotropic Radiated Power
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
FCC Federal Communications Commission
FR1 frequency range 1, which includes sub-6 GHz frequency bands
FR2 frequency range 2, which includes frequency bands from 24.25 GHz to 52.6 GHz
gNB (or gNodeB) base station for 5G/NR, i.e., a node providing NR user plane and control plane protocol terminations towards the UE, and connected via the NG interface to the 5GC
ICNIRP International Commission on Non-Ionizing Radiation Protection
I/F interface
LTE long term evolution
MAC medium access control
max maximum
MME mobility management entity
MPE maximum permissible exposure MPR Maximum Power Reduction
ng or NG next generation
ng-eNB or NG-eNB next generation eNB
NR new radio
N/W or NW network
PDCCH Physical Downlink Control Channel
PDCP packet data convergence protocol
PHY physical layer
PUCCH Physical Uplink Control Channel
PUSCH Physical Uplink Shared Channel
RAN radio access network
Rel release
RF radio frequency
RLC radio link control
RNTI Radio Network Temporary Identifier
RSRP Reference Signal Received Power
RRH remote radio head
RRC radio resource control
RS Reference Signal
RU radio unit
Rx receiver
SAR specific absorption rate
SCS subcarrier spacing
SDAP service data adaptation protocol
SFI Slot Format Indication
SGW serving gateway
SMF session management function
SP SRS Semi-Persistent SRS
SRS Sounding Reference Signal
TBD To Be Determined
TDD Time Domain Duplex
TS technical specification
Tx transmitter
UE user equipment (e.g., a wireless, typically mobile device)
UL Uplink (from the UE toward the network)
UPF user plane function
W watts The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for determination and use of uplink duty cycle in TDD. Additional description of these techniques is presented after a system into which the exemplary embodiments may be used is described.

Turning to FIG. 1, this figure shows a block diagram of one possible and non-limiting exemplary system in which the exemplary embodiments may be practiced. A user equipment (UE) 110, radio access network (RAN) node 170, and network element(s) 190 are illustrated. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a control module 140, comprising one of or both parts 140-1 and/or 140-2, which may be implemented in a number of ways. The TDD UL module 140 may be implemented in hardware as control module 140-1, such as being implemented as part of the one or more processors 120. The control module 140-1 may be implemented also as an integrated circuit or through other hardware such as a programmable gate array. In another example, the control module 140 may be implemented as control module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 is a base station that provides access by wireless devices such as the UE 110 to the wireless network 100. The RAN node 170 may be, for instance, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a control module 150, comprising one of or both parts 150-1 and/or 150-2, which may be implemented in a number of ways. The control module 150 may be implemented in hardware as control module 150-1, such as being implemented as part of the one or more processors 152. The control module 150-1 may be implemented also as an integrated circuit or through other hardware such as a programmable gate array. In another example, the control module 150 may be implemented as control module 150-2, which is implemented as computer program code 153 and is executed by the one or more processors 152. The one or more memories 155 and the computer program code 153 are configured to, with the one or more processors 152, cause the RAN node 170 to perform one or more of the operations as described herein. Note that the functionality of the control module 150 may be distributed, such as being distributed between the DU 195 and the CU 196, or be implemented solely in the DU 195.

The one or more network interfaces 161 communicate over a network such as via the links 176 and 131. Two or more RAN nodes 170 communicate using, e.g., link 176. The link 176 may be wired or wireless or both and may implement, e.g., an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 198 also indicates those suitable network link(s)

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances (including Internet of Things devices) permitting wireless Internet access and possibly browsing, tablets with wireless communication capabilities, as well as portable units or terminals that incorporate combinations of such functions.

Having thus introduced one suitable but non-limiting technical context for the practice of the exemplary embodiments of this invention, the exemplary embodiments will now be described with greater specificity.

As previously described, to ensure compliance with applicable electromagnetic energy absorption requirements and addressing unwanted emissions, RAN4 has agreed so far to using two techniques for New Radio (NR): P-MPR and maxUplinkDutyCycle. These are provided by 3GPP TS 38.101-2:

6.2.4 Configured Transmitted Power

P-MPR$_{f,c}$ is the allowed maximum output power reduction and maxUplinkDutyCycle as defined in TS 38.331 [13] is the UE reported maximum duty cycle to facilitate the compliance described below with P-MPR$_{f,c}$<[TBD] dB. The evaluation period for maxUplinkDutyCycle is 10 ms.

a) ensuring compliance with applicable electromagnetic energy absorption requirements and addressing unwanted emissions/self desense requirements in case of simultaneous transmissions on multiple RAT(s) for scenarios not in scope of 3GPP RAN specifications;

b) ensuring compliance with applicable electromagnetic energy absorption requirements in case of proximity detection is used to address such requirements that require a lower maximum output power.

The UE shall apply $P\text{-}MPR_{f,c}$ for carrier f of serving cell c only for the above cases.

For UE conformance testing $P\text{-}MPR_{f,c}$ shall be 0 dB

NOTE 1: $P\text{-}MPR_{f,c}$ was introduced in the $P_{CMAX,f,c}$ equation such that the UE can report to the gNB the available maximum output transmit power. This information can be used by the gNB for scheduling decisions.

NOTE 2: $P\text{-}MPR_{f,c}$ and maxUplinkDutyCycle may impact the maximum uplink performance for the selected UL transmission path.

As can be seen from above quote, RAN4 has considered use of both P-MPR and uplink duty cycle to address RF exposure compliance. It is noted that an UL duty cycle is a share of UL allocation within certain time period, e.g., allowed duty cycles of 10, 20, 40, 60, 80, or 100 percent (%). However, as highlighted in "NOTE 2", use of both methods impact uplink performance negatively. During the RAN4 #89, the UE capability maxUplinkDutyCycle was approved, where the capability allows the UE to signal its preferred maximum UL duty cycle to the network. The related agreements from RAN4 #89 are as follows:

Decide whether to solely rely on P-MPR to maintain compliance with RFE limits, or introduce mitigation techniques. Agreements:
  Not enough to solely rely on P-MPR
  Introduce techniques to facilitate RFE compliance and mitigate radio link failure
Solutions/potential mitigation techniques for Rel-15
  Maximum uplink duty cycle restriction, study configuration with capability
Solutions/potential mitigation techniques for Rel-16
  Dynamically indicated maximum uplink duty cycle restriction
  UE provides information for network to avoid UL failure (UE initiated)
    e.g. information about P-MPR being reported to the network by the UE
  Other solutions not precluded In Rel-15, the maxUplinkDutyCycle is provided in IE RF-Parameters, i.e., in the UE capability for FR1 (frequency range 1). The UE will apply this for any direction that needs to meet defined emission requirements (e.g., towards the head of the user, this may be achieved, e.g., by proximity sensors). The maxUplinkDutyCycle is provided in IE RF-Parameters, as follows:

maxUplinkDutyCycle-PC2-FR1 ENUMERATED {n60, n70, n80, n90, n100}OPTIONAL

The corresponding max uplink duty cycle capability values for FR2 (frequency range 2) were agreed in RAN4 #90bis as follows: "Agreement: the options of duty cycle are 15%, 20%, 25%, 30%, 40%, 50%, 60%, 70%, 80%, 90% and 100%".

Possible examples of RF exposure limits can be found in ICNIRP requirements or in FCC rules:

ICNIRP, "Guidelines for limiting exposure to time-varying electric, magnetic, and electromagnetic fields (up to 300 GHz)," Health Phys., vol. 74, no. 4, pp. 494-522, April 1998.

FCC, Code of Federal Regulations CFR Title 47, Part 1.1310, Radiofrequency Radiation Exposure Limits, Federal Commun. Commission, Washington, DC, USA, August 1997.

Typically for lower frequency bands (e.g., less than 3 GHz) the limits are set by specific absorption rate (SAR), which determines RF power absorbed by certain mass (of living body-like material) [in W/kg]. For above 6 Ghz, the set limits for example to maximum exposure limits/guidelines are for the maximum incident power density ($W/m^2$) measured/averaged over certain area (e.g., 20 $cm^2$).

Then, based on the used antenna or antenna array gain, the maximum allowed transmission power to meet the said limit is mapped to a given distance. Distance can be for example determined by the aforementioned requirements/guidelines and the antenna/antennae array gain from given device implementation.

Hence the afore-noted requirements/guidelines can be used to determine the allowed maximum transmission power to meet the emission limits, e.g., when a certain object is within a certain distance. This then can be used to determine the power back-off (P-MPR, MPR) as a separation of actual maximum transmission power capability of the UE and the maximum allowed transmission power to meet the said limits/guidelines.

In addition or alternatively, as the afore-noted requirements also account for the time aspect, i.e., emission is determined over a certain time period, it is possible to determine required time domain restriction to the transmission to meet the said limits/guidelines.

One exemplary problem is that UL operation relies on a static parameter for the maximum allowed uplink duty cycle the UE provides in capability information. Maximum permissible exposure (MPE) related conditions at the UE typically change dynamically, especially in FR2, where UE operates using "beams" for both downlink reception and uplink transmission. In FR2, the UE is equipped with antenna panels and the UE operates both in downlink and uplink using beams that are narrower than omni-direction/wider beams typically used in FR1 per antenna. Thus, in FR2, it can be argued that MPE related restrictions are beam specific and as UE moves and/or rotates, the MPE conditions change dynamically within the same beam and across different beams. Consequently, it can be noted that more dynamic handling is required to be able to adapt to the current prevailing MPE conditions than to assume only the capability information provided by the UE is useful. In other words, the current (semi-)static uplink maximum duty cycle given by the UE in the beginning of the connection limits the achievable uplink performance during the connection.

Dynamic RF exposure handling then, on the other hand, may introduce a high amount of signaling needed between the UE 110 and gNB (as RAN node 170) to enable the UE to dynamically indicate the current allowed uplink duty cycle, and especially in FR2, where the UE would need to report maximum uplink duty cycle per candidate transmission beam. Thus, while dynamic handling is desired an efficient means to reduce signaling overhead between gNB and UE needs to be developed.

Regarding NR operation, a slot format indicates how each of the symbols within a single slot is used. The slot format defines which symbols are used for uplink and which symbols are used for downlink within a specific slot. In LTE TDD, if a subframe (equivalent to a slot with 15 kHz subcarrier spacing, SCS, in NR) is configured for DL or UL, all of the symbols within the subframe should be used as DL or UL. But in NR, the symbols within a slot can be configured in various ways as follows: A single slot can be divided into multiple segments of consecutive symbols that can be used for DL, UL or Flexible. Predefined symbol allocations within a slot are called a slot format.

By applying a slot format or combining different slot formats in sequence, one can implement various different types of scheduling. The UE 110 may be provided slot format configuration to be applied in several ways.

If a UE is provided TDD-UL-DL-ConfigurationCommon, the UE sets the slot format per slot over a number of slots as indicated by TDD-UL-DL-ConfigurationCommon.

The TDD-UL-DL-ConfigurationCommon provides:
1) a reference SCS configuration; and
2) pattern1.

The pattern1 provides:
1) a slot configuration period of P msec;
2) a number of slots with only downlink symbols;
3) a number of downlink symbols;
4) a number of slots with only uplink symbols; and
5) a number of uplink symbols.

If a UE is provided with TDD-UL-DL-Configuration-Common that provides both pattern1 ($P_1$) and pattern2 ($P_2$), the UE sets the slot format per slot over a first number of slots as indicated by pattern1, and the UE sets the slot format per slot over a second number of slots as indicated by pattern2. pattern2 has the same parameters as pattern1. A UE expects that $P_1+P_2$ divides 20 msec.

If the UE is additionally provided TDD-UL-DL-ConfigDedicated, the parameter TDD-UL-DL-ConfigDedicated overrides only flexible symbols per slot over the number of slots as provided by TDD-UL-DL-ConfigurationCommon.

Theoretically, one could think of almost infinite number of possible combinations of DL symbol, UL symbol, Flexible Symbol within a slot, but 3GPP allows only 55 predefined symbol combinations within a slot as defined in Table 11.1.1-1, in 3GPP TS 38.213. Thus, 55 predefined slot formats are provided in Table 11.1.1-1 for PDCCH based slot format indication. As previously stated, these predefined symbol allocations within a slot are called a slot format.

The UE may be configured by higher layers with parameter SlotFormatIndicator, and SFI-RNTI to monitor and receive DCI format 2_0 for more dynamic slot format indication. An SFI-index field value in a DCI format 2_0 indicates to a UE a slot format for each slot in a number of slots for each DL BWP or each UL BWP starting from a slot where the UE detects the DCI format 2_0.

Additionally, Table 11.1.1-1, in 3GPP TS 38.213 actually relates to this type of SFI operation, i.e., DCI format 2_0 (if configured) can be used to indicate to the UE what is the slot format i.e. as stated in Section 11 of 3GPP TS 38.213: "A SFI-index field value in a DCI format 2_0 indicates to a UE a slot format for each slot in a number of slots for each DL BWP or each UL BWP starting from a slot where the UE detects the DCI format 2_0. The number of slots is equal to or larger than a PDCCH monitoring periodicity for DCI format 2_0."

The exemplary embodiments address these issues. As an exemplary idea, RF exposure limit handling at the UE is proposed, where a determined maximum (max) uplink duty cycle is evaluated together with determined prevailing DL/UL configuration in the serving cell for determining actions due to MPE by the UE, and the max uplink duty cycle may be reported. That is, the UL duty cycle can affect the radiation exposure in UL, since more (relative) UL TX opportunities means the UE can transmit each opportunity at a lower power, and to ensure compliance with applicable electromagnetic energy absorption requirements and addressing unwanted emissions, different UL duty cycles may be applied. For instance, with certain TX power, the UE may be able to transmit only 60% of the time in order to fulfill emission related requirements, and the UE could report this max UL duty cycle to the gNB. In response to using this type of reporting, one target is to reduce signaling load from the UE to the gNB, i.e., signaling using which the UE 110 informs the gNB 170 about the UE's supported duty cycle, e.g., per beam.

Another possibility concerns the interplay between UL duty cycle and bandwidth. For bandwidth, in uplink, the total transmission power (and EIRP) is dependent on the transmission bandwidth. In order to be able to fulfill emission related requirements, one option is to reduce transmission power. This will naturally affect the achievable coverage. The coverage could be attempted to be maintained or the impact minimized by reducing bandwidth. In more detail, for uplink, typically the UE determines power spectral density, e.g., transmission power per frequency unit. Transmission power increases with the bandwidth, which means that EIRP is a function of bandwidth. Consequently, one possibility to fulfill emission requirements is to decrease transmission power, which can result in that the UL transmission power cannot meet the set level from an UL coverage perspective. Thus, the UE could suggest (e.g., a smaller) bandwidth, using which the UE could support a certain duty cycle (e.g. 100%) while maintaining the UL transmission power above a certain level. In another example, the UE could provide the network with one or more duty cycles, each associated with maximum UL bandwidth and/or transmission power. The UL bandwidth in this context could be maximum UL allocation bandwidth or the UL BWP bandwidth. This would allow the network to improve and possibly optimize the scheduling strategy and resource allocation. If wider UL allocation is used, requiring higher UL transmission power (to be reached by network), less time domain allocation can be used, but it may not have negative impact if the time domain allocations are restricted also due to other reasons. On other hand if frequency domain resources are limited for some reason, network, equipped with information from the UE about the possibility to use higher duty cycle with lower UL bandwidth, could compensate this by using more time domain resources.

Figure 2:
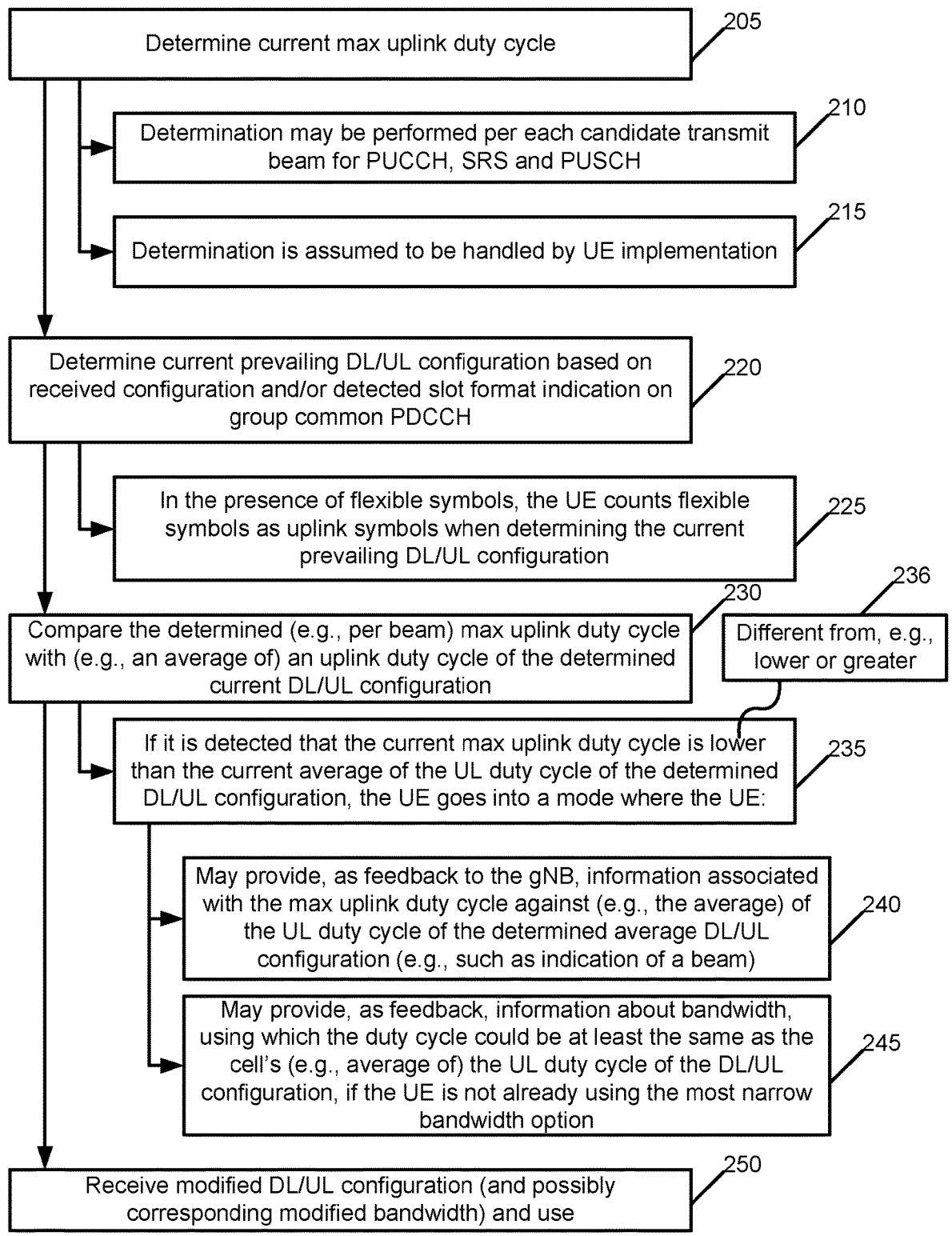
FIG. 2 is a logic flow diagram performed by a UE for determination and use of uplink duty cycle in TDD, in accordance with an exemplary embodiment.

FIG. 2 is a logic flow diagram performed by a UE for determination and use of uplink duty cycle in TDD. FIG. 2 also illustrates the operation of an exemplary method or methods, a result of execution of computer program instructions embodied on a computer readable memory, functions performed by logic implemented in hardware, and/or interconnected means for performing functions in accordance with exemplary embodiments. The operations in FIG. 2 are performed by the UE 110, e.g., under control at least in part of the control module 140. It is noted that the RAN node 170 is considered to be a gNB 170 in the examples that follow. This is, however, for ease of exposition, and not a limitation, and the various entities that can be the RAN node 170 described above are also valid, as potentially are other entities.

In block 205, the UE 110 determines a current maximum (max) uplink duty cycle. This may be considered to be a "temporal" uplink duty cycle, because the required maximum uplink duty cycle changes over time, e.g., due to applied transmission beam and rotation of the UE (e.g., the beam goes towards a human body and the beam goes away from the human body). Thus, the term "temporal" tries to capture a required duty cycle at a certain time (which may change over time). As indicated in block 210, the determination may be performed per each candidate transmit beam for PUCCH, SRS and/or PUSCH. Additionally, the candidate beam refers to an activated spatial source for PUCCH resources and SP-SRS resources, and/or to configured spatial sources in SRS triggering states.

As indicated in block 215, the determination is assumed to be handled by UE implementation. It is further noted that for required EIRP when evaluating the allowed duty cycle, the UE 110 assumes transmission bandwidth according to BWP. That is, in uplink, typically the UE determines power spectral density, e.g. transmission power per frequency unit. Since transmission power increases with the bandwidth, the UE may assume its transmission bandwidth is equivalent to its BWP, which fixes the bandwidth aspect of the UL duty cycle.

In block 220, the UE determines current prevailing DL/UL configuration based on received configuration (TDD-UL-DL-ConfigurationCommon or TDD-UL-DL-ConfigurationCommon and TDD-UL-DL-ConfigDedicated) and/or detected slot format indication on group common PDCCH (DCI format 2_0). As indicated in block 225, in the presence of flexible symbols, the UE 110 counts flexible symbols as uplink symbols when determining the current prevailing DL/UL configuration.

Figure 4:
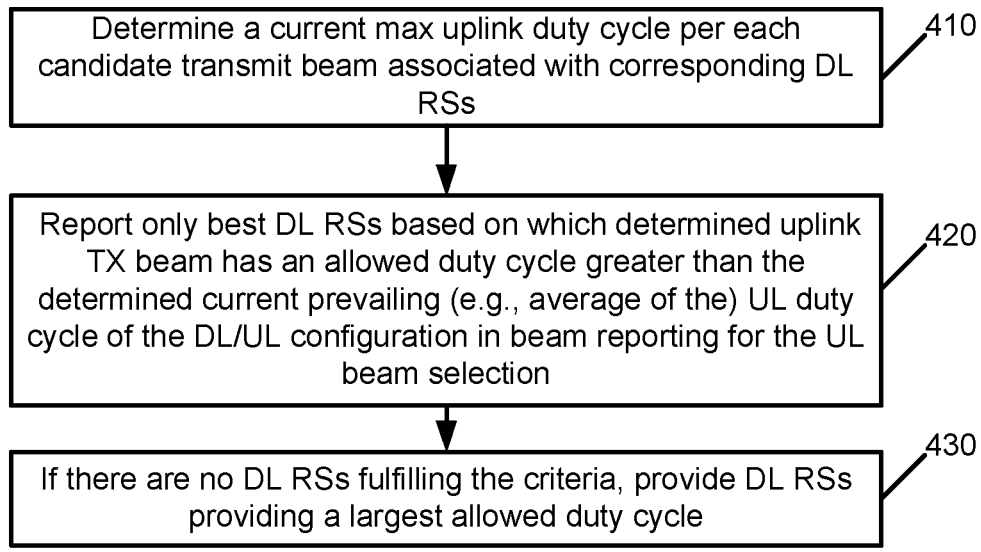
FIG. 4 is a logic flow diagram performed by a UE for determination and use of uplink duty cycle in TDD, in accordance with another exemplary embodiment.

In block 230, the UE 110 compares the determined (e.g., per beam) max uplink duty cycle with an uplink duty cycle of the determined current DL/UL configuration. This could be a single UL duty cycle or an average, e.g., over some time period. In block 235, if it is detected by the UE that the current max uplink duty cycle is lower than the current UL duty cycle of the determined DL/UL configuration (this evaluation may have some evaluation period in order to create an average, if this is desired, and the period may be longer than, e.g., 20 ms, which is the maximum that can be indicated by SFI in DCI) the UE goes into a mode where one or more of the following are performed:

1) In block 240, the UE may provide, as feedback to the gNB 170, information associated with the max uplink duty cycle against (i.e., relative to) the current (or average of the) UL duty cycle of the determined DL/UL configuration. In more detail, the gNB 170 may dynamically adjust DL/UL configuration and indicate this configuration (e.g., or its updating) via, e.g., group common PDCCH to UEs 110. Thus, it may as one example be considered here that the UE 110 would determine average UL duty cycle of the DL/UL configuration, as also for the uplink duty cycle, some time period is assumed. In other words, an average UL duty cycle of the DL/UL configuration is over some time period, if an average is used. Any uplink duty cycle that is beyond the determined UL duty cycle or its average of the DL/UL configuration would improve UE emissions, and the max uplink duty cycle (relative to and greater than the UL duty cycle or its average of the DL/UL configuration) would have the most improvement, and indication of a beam that supports the max uplink duty cycle is therefore reported in an exemplary embodiment. FIG. 4 considers another exemplary embodiment, where DL RSs are reported (see blocks 420 and 430 of FIG. 4).

2) In block 245, the UE may also provide, as feedback, information about bandwidth using which the duty cycle could be at least the same as the cell's UL duty cycle of the DL/UL configuration if the UE is not already using the most narrow bandwidth option (in uplink the transmission EIRP is a function of the transmission bandwidth), i.e., the UE could suggest bandwidth using which the duty cycle could be at least the cell's uplink share. Regarding the bandwidth, in uplink the total transmission power (and EIRP) is dependent on the transmission bandwidth. In order to be able to fulfill emission related requirements, one option is to reduce transmission power. That could be handled by reducing bandwidth. That is, the UE could suggest bandwidth using which the UE 110 could support a certain duty cycle (e.g. 100%). If the UE 110 is already using the most narrow bandwidth option, then the UE need not report the information about bandwidth, as the bandwidth could not be narrowed any further. As a further example, one reporting option would be where UE reports bandwidth for which the UE can support certain UL duty cycle (e.g., 100% or at least 60%). The gNB may then adjust/schedule bandwidth accordingly or re-configure a corresponding bandwidth part to have the bandwidth provided by the UE.

It is noted that description herein (see block 235) considers an instance where the current max uplink duty cycle is lower than the current (or average of the) UL duty cycle. However, as block 236 indicates, it is possible to consider whether the current max uplink duty cycle is lower than or greater than the current (or average of the) UL duty cycle of the determined DL/UL configuration. That is, both could be considered, e.g.:

1) If the duty cycle, e.g., amount of activity in UL in terms of time, is lower than enabled by the DL/UL slot configuration, the NW could be made aware that all UL allocation space cannot be used.

2) For the other way around, where the duty cycle is higher than that enabled, if the duty cycle would allow greater UL allocations than the current DL/UL slot configuration, the UE could inform to the NW that more UL 'capacity' could be supported.

It is noted that, as a default, the UE is assumed to report to the gNB a current supported UL duty cycle. That may lead to high signaling overhead, especially when the UE may have multiple candidate transmission beams but also with a single beam. One exemplary benefit of FIG. 2 is that the UE may determine that it does not need to inform the gNB about a supported UL duty cycle if the duty cycle is higher than a current UL share in the cell (that is, an amount of UL resources within certain period).

Note that in block 250, the UE may receive from the gNB a modified DL/UL configuration (and possibly corresponding modified bandwidth). If received, the UE will use the modified DL/UL configuration, which should then require less UL radiation exposure as compared with the previously used DL/UL configuration.

Figure 3:
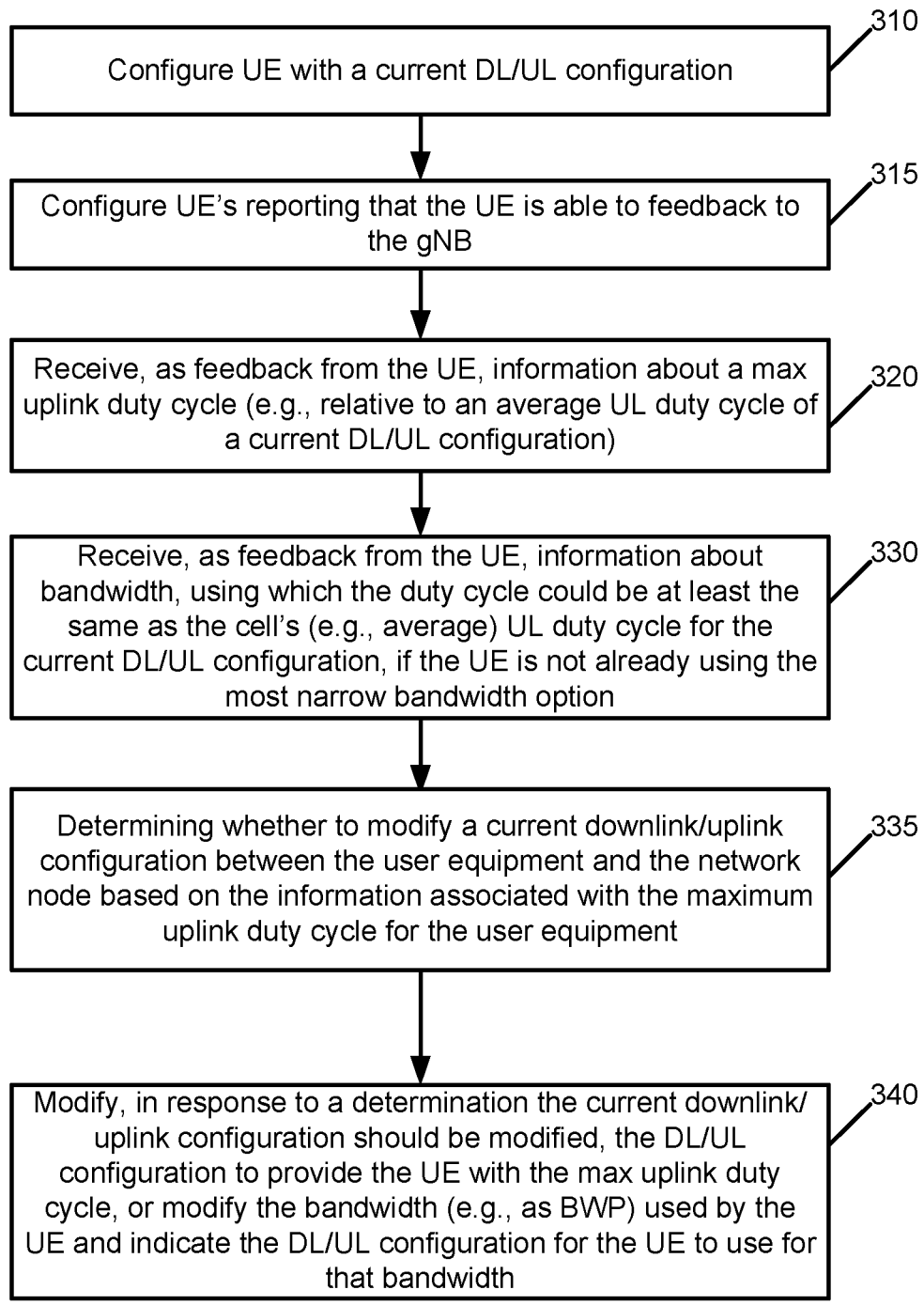
FIG. 3 is a logic flow diagram performed by a gNB for determination and use of uplink duty cycle in TDD, in accordance with an exemplary embodiment.

Turning to FIG. 3, FIG. 3 is a logic flow diagram performed by a gNB 170 for determination and use of uplink duty cycle in TDD, in accordance with an exemplary embodiment. FIG. 3 corresponds at least in part to FIG. 2, and illustrates the operations taken by the gNB 170. FIG. 3 also illustrates the operation of an exemplary method or methods, a result of execution of computer program instructions embodied on a computer readable memory, functions performed by logic implemented in hardware, and/or interconnected means for performing functions in accordance with exemplary embodiments. The operations in FIG. 3 are performed by the gNB 170, e.g., under control at least in part of the control module 150.

In block 310, the gNB 170 configures the UE 110 with a current DL/UL configuration. Another possible example is in block 315, where the gNB 170 configures the UE's reporting that the UE is able to feedback to the gNB. That is, the information described herein as being fed back from the UE to the gNB can be configured by the gNB 170.

In block 320, the gNB 170 receives, as feedback from the UE, information about a max uplink duty cycle relative to an UL duty cycle, or an average of the same, of a current DL/UL configuration. In block 330, the gNB 170 may also receive, as feedback from the UE 110, information about bandwidth, using which the duty cycle could be at least the same as the cell's UL duty cycle for the current DL/UL configuration, if the UE is not already using the most narrow bandwidth option. That is, if the UE is already using the most narrow bandwidth option, the UE would not send, and the gNB would not receive, this information.

In block 335, the gNB 170 determines whether to modify a current downlink/uplink configuration between the user equipment and the network node based on the information associated with the maximum uplink duty cycle for the user equipment.

In block 340, based on the received information, the gNB 170 modifies, in response to a determination the current downlink/uplink configuration should be modified, the DL/UL configuration to provide the UE with the max uplink duty cycle. The primary emphasis herein is to define UE functionality. However, the gNB could perform one or more of the following: 1) make a beam selection, discussed in more detail in reference to FIGS. 4 and 5; and/or 2) modify DL/UL configuration, e.g., so that there are UL resources of an amount which corresponds to UE's supported UL duty cycle (e.g., more UL resources if used might be wasted). In terms of modifying the DL/UL configuration, the gNB may additionally modify the bandwidth (e.g., as BWP) used by the UE, e.g., in response to block 245, and indicate the DL/UL configuration for the UE to use for that bandwidth.

Figure 5:
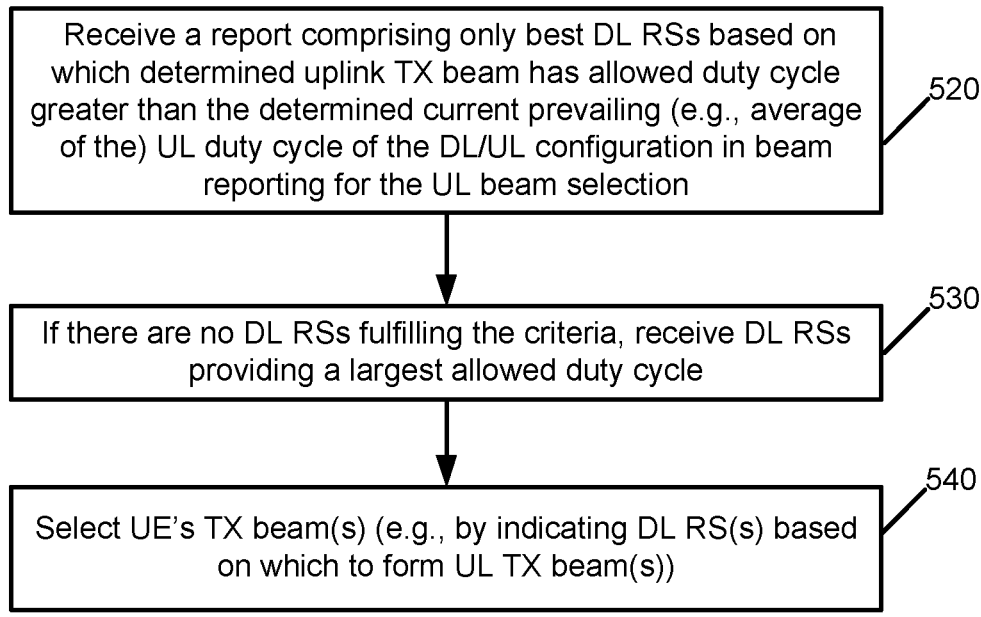
FIG. 5 is a logic flow diagram performed by a gNB for determination and use of uplink duty cycle in TDD, in accordance with another exemplary embodiment.

FIGS. 4 and 5 are directed to a more specific embodiment, performed by the UE 110 (FIG. 4) and correspondingly by the gNB 170 (FIG. 5). These figures are logic flow diagrams performed by a UE 110 (FIG. 4) or the gNB 170 (FIG. 5) for determination and use of uplink duty cycle in TDD, in accordance with another exemplary embodiment. These figures illustrate the operation of an exemplary method or methods, a result of execution of computer program instructions embodied on a computer readable memory, functions performed by logic implemented in hardware, and/or interconnected means for performing functions in accordance with exemplary embodiments. The operations in FIG. 4 are performed by the UE 110, e.g., under control at least in part of the control module 140, and the operations in FIG. 5 are performed by the gNB 170, e.g., under control at least in part of the control module 150.

In block 410, the UE 110 determines a current max uplink duty cycle per each candidate transmit beam associated with corresponding DL RSs. In other words, one way to determine an uplink TX beam is to use a DL RX (received at the UE) beam to receive DL RS and use this as an indication of an uplink TX beam (this may be a typical way of forming an UL beam). In block 420, the UE 110 reports only the best DL RSs based on which determined uplink TX beam has an allowed duty cycle greater than or equal to the determined current prevailing UL duty cycle of the DL/UL configuration in beam reporting for the UL beam selection. More specifically, the UE determines from DL RS the uplink beam (i.e. the same as receive beam for receiving DL RS) and determines pathloss from DL RS and thus required EIRP. Then, the UE determines the allowed duty cycle with that EIRP to fulfill emission requirements. That is, the duty cycle allowed to be used by the UE, e.g., as one of multiple available duty cycles. Also, in block 430, if there are no DL RSs fulfilling the criteria, the UE 110 provides one or more DL RSs providing a largest allowed duty cycle.

In FIG. 5, in block 520, the gNB 170 receives a report from the UE 110 comprising only the best DL RSs based on which determined uplink TX beam has allowed duty cycle greater than or equal to the determined current prevailing UL duty cycle of the DL/UL configuration in beam reporting for the UL beam selection. In block 530, if there are no DL RSs fulfilling the criteria, the gNB 170 receives DL RSs providing a largest allowed duty cycle. In block 540, the gNB 170 selects the UE's TX beam(s) (e.g., by indicating DL RS(s) based on which the UE will form UL beam(s)). That is, the gNB may then select some of the DL RSs and inform the UE to form uplink beam(s) on those.

FIGS. 4 and 5 provide examples where the UE only reports the best DL RSs, where the "best" is based on which determined uplink TX beam has allowed duty cycle greater than the determined current prevailing DL/UL configuration. The UE reports these in beam reporting for the UL beam selection. If there are no DL RSs fulfilling the criteria, the UE provides DL RSs providing a largest allowed duty cycle.

The above mechanisms may also be applied in handover. For instance, in another exemplary embodiment, RRM measurements, e.g., for handover purposes, are ordered so that the UE ranks DL RSs higher based on which of the UE's generated UL transmit beams would provide a highest uplink duty cycle or a strongest DL RS based on which of the UE's generated transmit beams would have a higher uplink duty cycle than the prevailing DL/UL configuration of the target cell.

A further example of operations the UE 110 might implement in an exemplary embodiment are the following:

1. The UE 110 determines (e.g., see block 220 of FIG. 2) the prevailing DL/UL configuration based on, e.g., one or more of the following:
   a. received TDD-UL-DL-ConfigurationCommon configuration;
   b. received TDD-UL-DL-ConfigurationCommon and TDD-UL-DL-ConfigDedicated configurations; and/or
   c. detected slot format indication on group common PDCCH (DCI format 2_0).

2. The UE 110 determines (see also block 205 of FIG. 2) a current max uplink duty cycle per each candidate UL transmit beam associated with the DL RSs configured for the beam measurements for UL beam selection.

3. The UE 110 receives a beam reporting request for an UL beam selection.

4. The UE 110 reports the best DL RSs that can be used to determine the UL TX beam while allowing a duty cycle greater than the determined prevailing DL/UL configuration (e.g., determined in operation 1 above). See also block 430 of FIG. 4.

Without in any way limiting the scope, interpretation, or application of the claims appearing below, a technical effect and advantage of one or more of the example embodiments disclosed herein is the techniques minimize the amount of signaling needed between a UE and a gNB to update dynamically the max uplink duty cycle by taking into account possible DL/UL configuration in the serving cell.

As used in this application, the term "circuitry" may refer to one or more or all of the following:
   (a) hardware-only circuit implementations (such as implementations in only analog and/or digital circuitry) and
   (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
   (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

In one example, a method comprises: determining, by a user equipment in a wireless communication system, the user equipment communicating with a network node in the wireless communication system using time-division duplexing, a current downlink/uplink configuration between the user equipment and the network node; determining by the user equipment a maximum uplink duty cycle for one or more candidate uplink transmit beams; comparing by the user equipment the maximum uplink duty cycle with an uplink duty cycle of the determined current downlink/uplink configuration; and providing, by the user equipment and towards the network node, information associated with the comparison of the maximum uplink duty cycle and the uplink duty cycle of the determined current downlink/uplink configuration.

The providing may be performed only in response to the maximum uplink duty cycle being greater than the uplink duty cycle of the determined current downlink/uplink configuration. The information associated with the comparison may comprise indication of an uplink beam that supports the maximum uplink duty cycle. The information associated with the comparison may comprise indication about bandwidth, using which the uplink duty cycle could be at least the same as the uplink duty cycle of the determined current DL/UL configuration, wherein the information about bandwidth is only provided in response to the user equipment not already using a most narrow bandwidth option. The determining by the user equipment a maximum uplink duty cycle for one or more candidate uplink transmit beams may be for candidate uplink transmit beams that correspond to associated downlink reference signals; and the providing information associated with the comparison may comprise providing indication of one or more downlink reference signals determined to be best and that can be used to determine a corresponding uplink transmit beam for the user equipment while allowing an uplink duty cycle greater than the determined the uplink duty cycle of current downlink/uplink configuration. The determining by the user equipment a maximum uplink duty cycle for one or more candidate uplink transmit beams may be for candidate uplink transmit beams that correspond to associated downlink reference signals; and the providing information associated with the comparison may comprise providing indication of one or more downlink reference signals determined to provide a largest duty cycle and that can be used to determine a corresponding uplink transmit beam for the user equipment while allowing an uplink duty cycle greater than the uplink duty cycle of the determined current downlink/uplink configuration. The determining of the current downlink/uplink configuration may further comprise the user equipment counting, in a presence of flexible symbols, flexible symbols as uplink symbols when determining the current downlink/uplink configuration. The determining of the maximum uplink duty cycle for one or more candidate uplink transmit beams may be performed per each candidate transmit beam for one or more of a physical uplink control channel, sounding reference signal, or physical uplink channel. The determining of the current downlink/uplink configuration may determine the current downlink/uplink configuration using one or more of the following: received TDD-UL-DL-ConfigurationCommon configuration; received TDD-UL-DL-ConfigurationCommon and TDD-UL-DL-ConfigDedicated configurations; or detected slot format indication on group common PDCCH. The method may further comprise receiving, by the user equipment and in response to providing the information associated with the comparison, a modified downlink/uplink configuration and using by the user equipment the modified downlink/uplink configuration. The method may further comprise receiving by the user equipment modified bandwidth that corresponds to the modified downlink/uplink configuration and using by the user equipment the modified bandwidth in conjunction with the modified downlink/uplink configuration. An average of the uplink duty cycle of the determined current downlink/uplink configuration may be used instead of the uplink duty cycle of the determined current downlink/uplink configuration.

In another example, a method comprises: receiving, at a network node in a wireless communication system and from a user equipment in the system, information associated with a comparison between a maximum uplink duty cycle for the user equipment and an uplink duty cycle of a current downlink/uplink configuration between the user equipment and the network node; determining by the network node whether to modify a current downlink/uplink configuration between the user equipment and the network node based on the information associated with the comparison; and indicating, by the network node and in response to a determination the current downlink/uplink configuration should be modified, a modified downlink/uplink configuration to the user equipment.

The information associated with the comparison may comprise indication of an uplink beam that supports the maximum uplink duty cycle. The information associated with the comparison may comprise indication about bandwidth, using which the uplink duty cycle could be at least the same as an uplink duty cycle of the determined current DL/UL configuration, wherein the information about bandwidth is only received in response to the user equipment not already using a most narrow bandwidth option. The method may further comprise the network node sending a plurality of downlink reference signals in a plurality of downlink beams toward the user equipment; the receiving information associated with the comparison may comprise receiving indication of one or more downlink reference signals determined to be best by the user equipment and that can be used to determine a corresponding uplink transmit beam for the user equipment while allowing an uplink duty cycle greater than the determined uplink duty cycle of current downlink/uplink configuration; and the determining whether to modify a current downlink/uplink configuration and the indicating the modified downlink/uplink configuration to the user equipment may use the one or more downlink reference signals determined to be best by the user equipment. The method may further comprise the network node sending a plurality of downlink reference signals in a plurality of downlink beams toward the user equipment; the receiving information associated with the comparison may comprise receiving indication of one or more downlink reference signals determined by the user equipment to provide a largest duty cycle and that can be used to determine a corresponding uplink transmit beam for the user equipment while allowing an uplink duty cycle greater than the uplink duty cycle of the determined current downlink/uplink configuration; and the determining whether to modify a current downlink/uplink configuration and the indicating the modified downlink/uplink configuration to the user equipment may use the one or more downlink reference signals determined by the user equipment to provide a largest duty cycle. The network node may configure the current downlink/uplink configuration using one or more of the following: received TDD-UL-DL-ConfigurationCommon configuration; received TDD-UL-DL-ConfigurationCommon and TDD-UL-DL-ConfigDedicated configurations; or detected slot format indication on group common PDCCH. The method may further comprise receiving by the network node one or more communications from the user equipment based on the modified downlink/uplink configuration. The indicating may further comprise indicating a modified bandwidth that corresponds to the modified downlink/uplink configuration and the receiving by the network node one or more communications from the user equipment based on the modified downlink/uplink configuration may further comprise receiving by the network node one or more communications from the user equipment based on the modified bandwidth and modified downlink/uplink configuration. An average of the uplink duty cycle of the determined current downlink/uplink configuration may be used instead of the uplink duty cycle of the determined current downlink/uplink configuration.

What is claimed is:
1. An apparatus, comprising:
   at least one processor; and
   at least one memory including computer program code, the at least one memory and the computer program code configured, with the at least one processor, to cause the apparatus to:
   determine, by the apparatus in a wireless communication system, the apparatus communicating with a network node in the wireless communication system using time-division duplexing, a downlink/uplink configuration between the apparatus and the network node;
   determine by the apparatus a maximum uplink duty cycle for one or more candidate uplink transmit beams;
   compare by the apparatus the maximum uplink duty cycle with an uplink duty cycle of the determined downlink/uplink configuration; and
   provide, by the apparatus and towards the network node, information associated with the comparison of the maximum uplink duty cycle and the uplink duty cycle of the determined downlink/uplink configuration, and
   the determining of the maximum uplink duty cycle for one or more candidate uplink transmit beams are for candidate uplink transmit beams that correspond to associated downlink reference signals; and
   when providing the information associated with the comparison, the at least one memory and the computer program code configured, with the at least one processor, to cause the apparatus to provide an indication of one or more downlink reference signals, determined to be best that can be used to determine a corresponding uplink transmit beam for the apparatus while allowing an uplink duty cycle greater than the uplink duty cycle of the determined downlink/uplink configuration, or
   determined to provide a largest duty cycle and that can be used to determine a corresponding uplink transmit beam for the apparatus while allowing an uplink duty cycle greater than the uplink duty cycle of the determined downlink/uplink configuration.

* * * * *